United States Patent [19]

Koch et al.

[11] 4,044,619
[45] Aug. 30, 1977

[54] DEVICE FOR CONTROLLING AUXILIARY MEANS ARRANGED IN THE RECIPROCATING CARRIAGE OF SINGLE OR MULTISTAGE PRESSES

[75] Inventors: Friedrich-Karl Koch; Hugo Schneiders, both of Krefeld, Germany

[73] Assignee: Peltzer & Ehlers, Krefeld, Germany

[21] Appl. No.: 589,793

[22] Filed: June 23, 1975

[51] Int. Cl.² .............................................. F16H 25/08
[52] U.S. Cl. ........................................................ 74/53
[58] Field of Search ............................................ 74/53

[56] References Cited

U.S. PATENT DOCUMENTS

| 2,803,226 | 8/1957 | Renoux | 74/53 |
| 3,353,417 | 11/1967 | Nebendorf et al. | 74/53 |

*Primary Examiner*—Samuel Scott
*Assistant Examiner*—Wesley R. Ratliff, Jr.
*Attorney, Agent, or Firm*—Herbert E. Kidder

[57] ABSTRACT

A device for actuating an ejector plunger or the like on the movable carriage of a press, comprising a two-arm lever pivoted on the carriage, one arm of which is operatively connected to the plunger. The other arm has a member that runs on a track extending parallel to the line of travel of the carriage. The track is located on a member that is mounted on a stationary part of the machine and is movable in the direction normal to the line of travel of the carriage. Operating means is connected to the member to move the same periodically in the transverse direction, thereby rocking the two-arm lever and actuating the plunger. During normal operational movement of the carriage, the member on said other arm of the lever moves parallel to the track and is not affected thereby.

7 Claims, 6 Drawing Figures

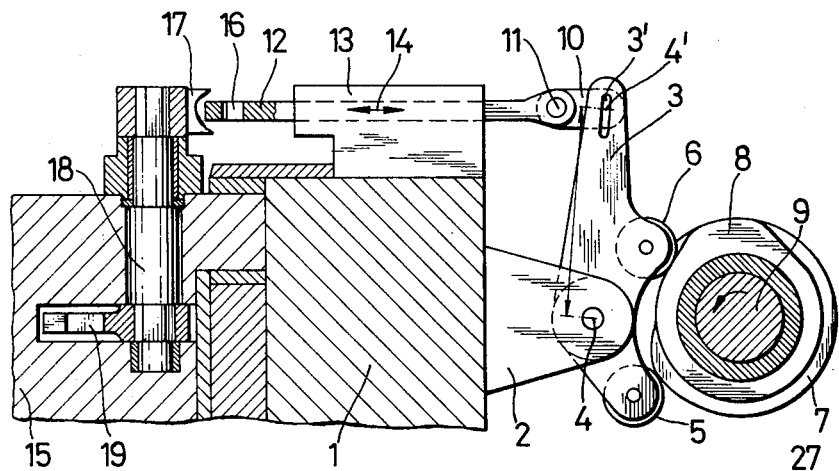
FIG. 1
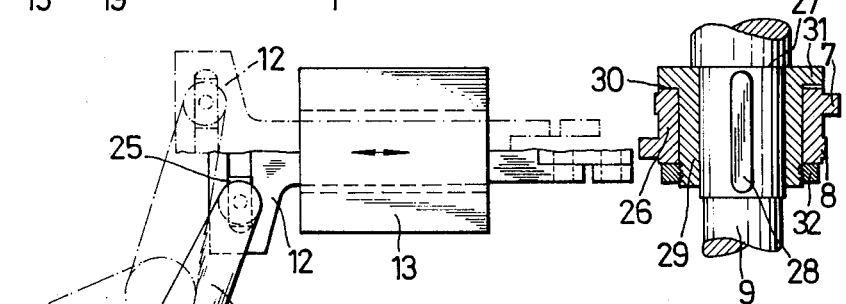
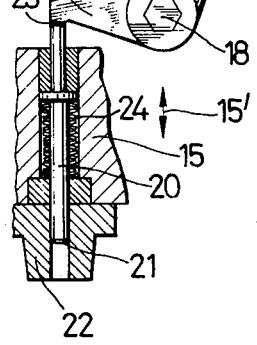
FIG. 2

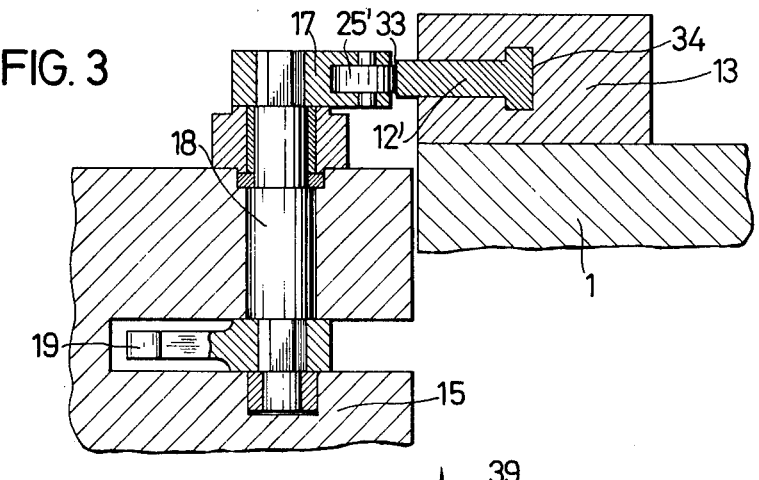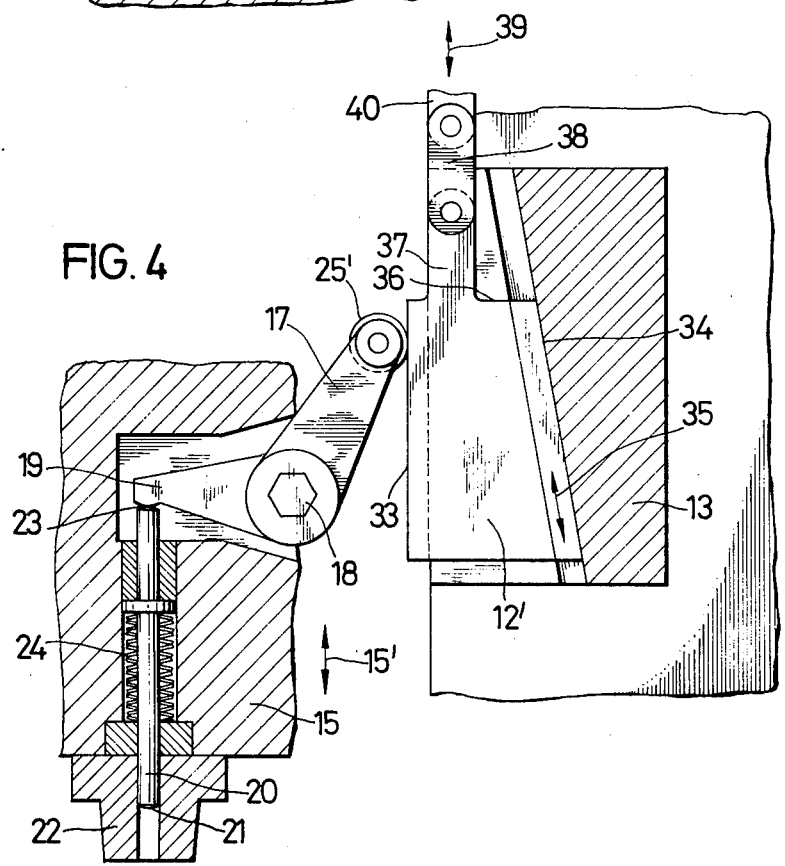

DEVICE FOR CONTROLLING AUXILIARY MEANS ARRANGED IN THE RECIPROCATING CARRIAGE OF SINGLE OR MULTISTAGE PRESSES

BACKGROUND OF THE INVENTION

The present invention pertains to a device for controlling auxiliary means, such as plunger ejector needles, strippers, etc., arranged in the reciprocating carriage of single- or multistage presses.

It is known in the art to control such auxiliary means which are moved back and forth with the press carriage over a crank drive, by means of a stationary curved track directly by the carriage movement. The disadvantage of such a device is that control depends necessarily on the movement of the carriage. Due to the stationary arrangement of the curved track, the sequence of motions during the forward and backward run is the same related to the front dead center. If the auxiliary means to be controlled is a plunger ejector needle, for example, the ejection time in this device must be placed in the rear dead center range in order to avoid pressure on the needle receding only during the advance of the carriage.

For a multistage press, it is furthermore known to use a control device where the ejecting means consists of two-arm levers which are mounted in an oscillating plunger holder. The two-arm levers, of which one is provided for each stage, are actuated by a control mechanism arranged in the machine body or press frame. Since both the carriage movement and the pivotal movement of the plunger holder must be considered in the control, this type of control is rather complicated. Besides the resulting additional loads of the plunger holder requires a stronger support. This results, however, in inertia forces, which is undesired, particularly in high-speed machines.

SUMMARY OF THE INVENTION

The present invention is based on the concept of providing a control device which is independent of the position and movement of the carriage, as well as of the movement of the connecting rod.

The problem is solved according to the invention in this way, that a slotted link with a guideway extending parallel to the direction of motion of the carriage can be moved in a track arranged in or on the press frame, independent of the movement of the carriage, back and forth as well as transverse to the path of motion of the carriage, and that the auxiliary means can be operated over a two-arm lever pivotally mounted in the carriage, whose one lever arm is connected to the auxiliary means, the other arm being connected frictionally or form-locked over transmission element with the slotted link.

The control device for the slotted link can have according to another feature of the invention a roller lever pivotally mounted in the frame press and articulated at one end of the slotted link, whose rollers bear on the tracks of a double cam disk.

According to another feature of the invention, the double cam disk is adjustable in circumferential direction relative to its drive shaft. This way the course of the reciprocating movement of the slotted link can be adjusted in time relative to the carriage movement, while the stroke length remains constant.

In the embodiment of the above-mentioned features of the invention, it is suggested that one end face of the double cam disk have radial serrations which mesh with corresponding radial serrations on a shaft collar or a hub part, and that a nut be screwed on the shaft or hub part which bears on the other end face of the double cam disk.

Furthermore, it can be provided that the distance of the bearing of the roller lever up to the fulcrum of the slotted link be adjustable, so that the stroke length of the sliding block can also be adjusted.

It is also possible to provide that the track of the slotted link be arranged in an acute angle to the direction of motion of the carriage.

In order to be able to adjust the stroke of the slotted link in this arrangement too, it is provided according to another feature of the invention that the angular position of the track of the slotted link to the direction of motion of the carriage be adjustable and the guideway arranged adjustably on the slotted link.

The transmission element can have, for example, a sliding block in which one arm of the two-arm lever is guided. It can also be provided that the transmission element have a roller which is arranged on the lever and pressed by spring action against a sliding slotted link of a flat piece.

BRIEF DESCRIPTION OF THE DRAWINGS

FIG. 1 shows a device for operating an ejector needle in a carriage in a vertical section;

FIG. 2 shows the device according to FIG. 1 in a horizontal section;

FIG. 3 shows another embodiment of the device according to FIGS. 1 and 2 in a vertical section;

FIG. 4 shows the device according to FIG. 3 in a horizontal section;

DESCRIPTION OF THE PREFERRED EMBODIMENT

Figure 5:
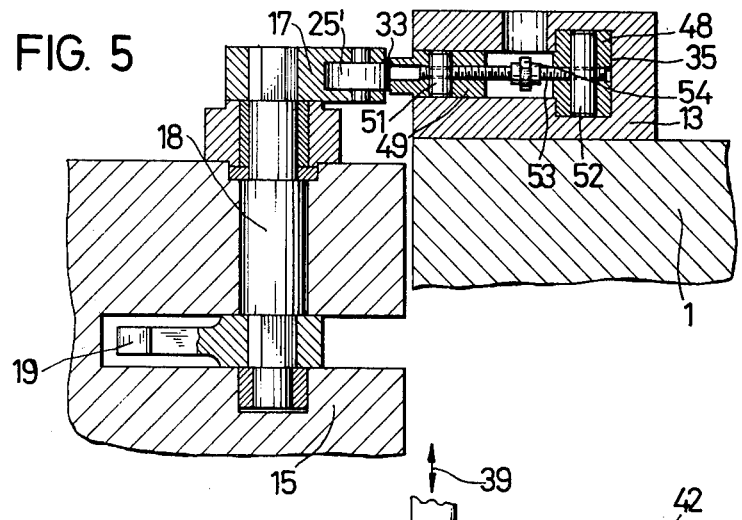
FIG. 5 shows a further development of the device according to FIGS. 3 and 4 in a vertical section.

FIGS. 1 and 2 show an embodiment of the control for operating an ejector needle in a carriage, with FIG. 1 representing a vertical section and FIG. 2 a horizontal section through the device.

According to FIG. 1, a projecting arm 2 is secured on the right side of the press frame 1, on which is mounted a roller lever 3 which has above and below a bearing 4 rollers 5 and 6, which are staggered relative to one another and which roll off on one of the two cam disks 7, 8, arranged in series, which are mounted on a uniformly rotating drive shaft 9. The cam disks 7, 8 are so shaped that both rollers 5, 6 bear on them at any time, so that the roller lever 3 performs a forced pivotal movement with constant amplitude.

At its upper end, the roller lever 3 has a vertical slot 3', in which is secured an articulated element 10. This element 10 is articulated with its fulcrum 11 to a slotted link 12 which moves back and forth in the direction of the arrows in a link housing arranged on the press frame 1. Slotted link 12 has at its left end a slot 16 extending in the direction of motion of the carriage 15, whose length corresponds at least to the maximum stroke of the carriage 15. Slot 16 is engaged by an arm 17 of a two-arm lever 18 mounted in the carriage 15. The other staggered arm 19 of the two-arm lever 18 is frictionally connected with the ejector needle, which can not be seen, however, in this Figure.

FIG. 2 illustrates the arrangement and method of operation of the control device in horizontal section, and shows the ejector needle 20 in the carriage 15, which protrudes with one end 21 into the bottom die 22 to form a bolt or the like, and is pressed with its other end 23 by a spring element 24 against the arm 19 of the two-arm lever 18 actuating it. The two arms 17,19 of this lever 18 are arranged in an obtuse angle to one another, the longer arm 17 protruding with a transmission element 25 in the form of a sliding block, articulated to its end, into the slot 16 of the T-shaped link 12.

The sliding block 25 slides during the movement of the carriage 15 back and forth in the slot 16 without the lever 18 being set in rotation. Only when the slotted link 12 is moved to the left by the roller lever 3 is the lever 18, represented in broken lines, so turned, as indicated by the half of the slotted link 12 (also shown in broken lines), that the ejector needle 20 is pressed into the bottom die 22 and thus ejects the molded piece. The stroke length of the ejector needle 20 can be varied by displacing the articulated element 10 in the slot 3' of the roller lever 3.

The right side of FIG. 2 shows in its axial section through the drive shaft 9 the fastening of the cam disks 7, 8. These are combined into a one-piece double cam disk 26, which is pushed over a hub part 29 bearing on a shaft shoulder 27 and connected by a key 28 with the drive shaft 9. One end face of the double cam disk 26 has radial serrations 30 which mesh with corresponding serrations on the end face of a collar 31 on the hub part 29. From the other side, a nut 32 screwed on the hub part presses the double cam disk 26 against the toothed collar so that the parts are form-licked with one another. By loosening the nut 32, the double cam disk 26 can be turned by one or more teeth relative to the hub part 29 and the drive shaft 9, respectively, so that a simple displacement in time with the movements of the ejector needle 20 relative to the carriage 15 is possible.

FIGS. 3 and 4 show another embodiment of the invention for controlling an auxiliary means, FIG. 3 representing a vertical section, and FIG. 4 a horizontal section.

The auxiliary means in the carriage 15 is only changed with regard to the transmission element 25, compared to that in FIGS. 1 and 2. FIG. 4 shows the two-arm lever 18, where the ejector needle 20 on the arm 19 is pressed by a spring element 24 into the bottom die 22. The other arm 17 of the lever 18 carries at its end a roller as a transmission element 25', which is pressed under the action of the spring element 24 against a slotted link 12'.

Link 12' is trapezoidal, the side 33, along which the transmission element 25' rolls during the reciprocal movement of the carriage 15, extending parallel to the direction of motion of the carriage, so that the lever 18 and the ejector needle 20 respectively are not moved during the stroke of the carriage when the slotted link stands still. The side 34 of the slotted link 12' opposite this side 33 extends in an acute angle to the direction of motion 15' of the carriage, as shown in FIG. 3, is T-shaped and can slide in the link housing 13 in a corresponding T-shaped groove, which is arranged in the same angle and protrudes from the slotted link 2 with the other side 33 in the direction of the arrows 35.

On the shorter end face 36, the slotted link has a projecting arm 37 on which is articulated a coupling element 38 on which in turn is articulated a driving rod 40 moving back and forth in the direction of the arrows 39. The driving rod 40 can be controlled over a crank drive or a roller lever, as shown in FIG. 1.

If the finished pressed part is to be ejected from the bottom die 22, the driving rod 40 is pulled upward so that the slotted link 12' performs a transverse movement with its inclined side 34, and the opposite side 33 moves to the left upward, but remains parallel to the direction of motion 15' of the carriage 15, so that its stroke can not have any effect on the movement of the ejector needle 20. Due to the transverse movement, the lever 18 is turned counterclockwise, so that the ejector needle 20 ejects the molded part.

Figure 6:
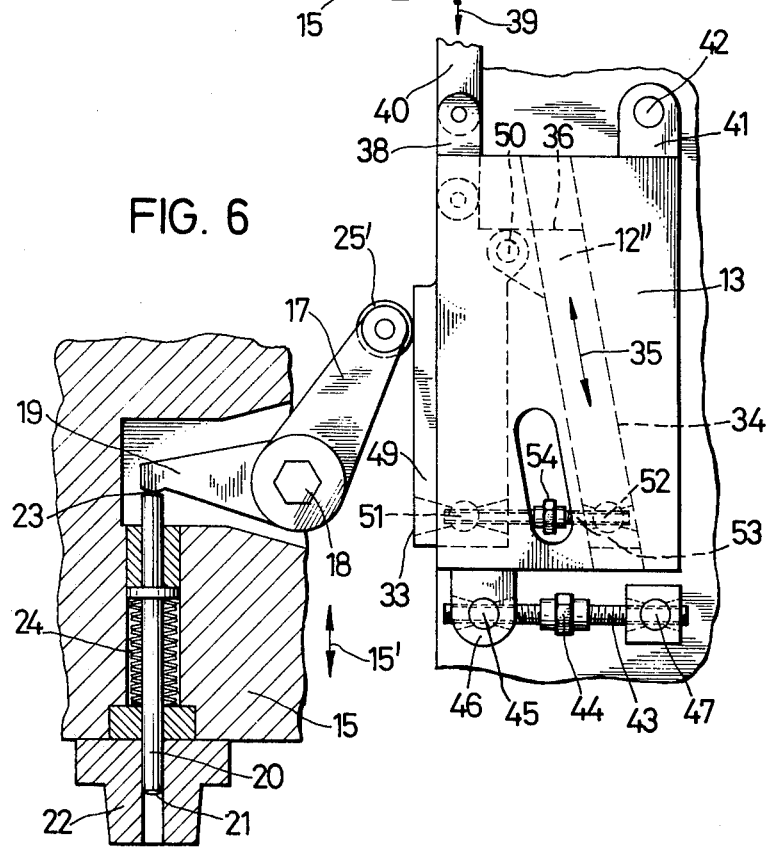
FIG. 6 shows the device according to FIG. 5 in a horizontal section.

FIGS. 5 and 6 likewise show in a vertical and horizontal section the device according to FIGS. 3 and 4, with an adjusting mechanism for the stroke of the ejector needle 20. The arrangement and the design of the auxiliary means in the carriage 15 are the same as in FIGS. 3 and 4. Principally the adjustment of the stroke of the ejector needle 20 is achieved by varying the angle formed by the inclined side 34 and the direction of motion 15' of the carriage 15. To this end the link housing 13 is mounted over a projecting arm 41 in its right upper corner in a pivot bearing 42 on on the press frame 1. The position of the link housing 13 is varied by means of an adjusting screw 42, which has a hexagon 44 in its center and is provided on both sides with a thread. On one side, the adjusting screw 43 engages with its thread a corresponding thread in journal 45 which is rotatably mounted on a projecting arm 46 in the corner of the link housing 13 diagonally opposite the pivot bearing 42. The other side of the adjusting screw 43 is likewise in engagement with a journal 47 mounted on the press frame 1.

With the rotation of the adjusting screw 43, actuated by a wrench over the hexagon 44, it is possible to vary the angle between the link housing 13 or the guide groove extending therein and the direction of motion 15' of the carriage 15. But in this case the side 33 of the slotted link 12" opposite the inclined surface is placed obliquely to the direction of motion 15' of the carriage 15, which would lead to undesired movements of the ejector needle 20 during the forming. For this reason it must be possible to place this side 33 parallel again. To this end the slotted link 12" consists of an arm 48 guided in the groove, on which a guide 49 is secured over a joint 50. On the free ends of the arm 48 and of the guide 49 are likewise arranged journals 51, 52, which each have a hole with a thread transverse to its longitudinal axis. Into these two threads is screwed an adjustment screw 53 with a hexagon 54 attached in its center, which connects the arm 48 with the guide 49.

If the link housing 13 is turned by turning the adjustment screw 43 arranged on the outside of the press frame 1, the side 33, on which the roller 25' of the lever 18 rolls off, can be again placed parallel to the direction of motion 15' of the carriage 15 by turning the adjustment screw 53. In this way the stroke of the ejector needle 20 can be increased with a constant stroke of the driving rod 40 in the direction of the arrows 40 by increasing the angle between the inclined side 34 of the link housing 12" and the direction of motion 15' of the carriage 15.

The present invention thus provides a device for controlling the auxiliary means arranged in the press carriage, which works independent of the movement of the carriage. Moreover, the course of actuation of the auxiliary means and its stroke length can be adjusted rapidly in time in a simple manner. Finally, the device is appealing because of its simple construction, which is therefore hardly susceptible to trouble.

What we claim is:

1. Apparatus comprising a reciprocating carriage (15) having an ejector plunger (20) that travels therewith;
   a two-arm lever (18) pivotally mounted on said carriage and movable therewith, one arm of said lever being operably connected to said ejector plunger;
   operating means (12) having a flat bearing surface (16, 33) slidably engaging the outer end of the other arm of said lever, said flat bearing surface extending parallel to the line of travel of said carriage, whereby reciprocating movement of said carriage merely causes said other arm of said lever to slide along said flat bearing surface without rocking said lever on its pivot;
   said operating means being movable in the direction perpendicular to said flat surface so as to rock said other arm of said lever about its pivot axis and thereby actuate said ejector plunger and
   means for periodically moving said operating means.

2. Apparatus as in claim 1, wherein said other arm of said lever has a roller (25) on its outer end that rides on said bearing surface; and spring means (24) is provided which holds said roller against said bearing surface.

3. Apparatus as in claim 1, wherein said means for periodically moving said operating means includes a double cam disk (26) mounted on a hub (29) fixed to a drive shaft (9); said double cam disk being angularly adjustable with respect to said hub.

4. Apparatus as in claim 3, wherein one end face of said double cam disk has radial serrations (30) formed thereon, which mesh with corresponding serrations on said hub; and a nut (32) holds said double cam disk against said serrations on said hub.

5. Apparatus as in claim 1 wherein said operating means (12') comprises a block having a flat bearing surface (33) on one side extending parallel to the line of travel of said carriage, and an inclined surface (34) on the other side thereof which rides on a stationary inclined surface, said block being slidable along said stationary inclined surface.

6. Apparatus as in claim 5, wherein said stationary inclined surface is adjustable as to angularity, and said inclined surface on said block is also adjustable as to angularity, whereby the length of stroke obtainable by a given length of travel of said block along said stationary inclined surface may be varied.

7. Apparatus as in claim 1, wherein said operating means (12) has a slot formed therein extending parallel to the direction of travel of said carriage, and said other arm of said lever (18) has a block slidably disposed within said slot.

* * * * *